United States Patent
Maron

(10) Patent No.: US 7,920,951 B2
(45) Date of Patent: Apr. 5, 2011

(54) METHOD AND CONTROL SYSTEM FOR APPLYING DEFINED CLAMPING FORCES

(75) Inventor: Christof Maron, Kelkheim (DE)

(73) Assignee: Continental Teves AG & Co., OHG, Frankfurt (DE)

(*) Notice: Subject to any disclaimer, the term of this patent is extended or adjusted under 35 U.S.C. 154(b) by 943 days.

(21) Appl. No.: 11/578,640

(22) PCT Filed: Apr. 15, 2005

(86) PCT No.: PCT/EP2005/051670
§ 371 (c)(1),
(2), (4) Date: Jun. 18, 2007

(87) PCT Pub. No.: WO2005/100113
PCT Pub. Date: Oct. 27, 2005

(65) Prior Publication Data
US 2008/0021624 A1    Jan. 24, 2008

(30) Foreign Application Priority Data

Apr. 17, 2004 (DE) .......................... 10 2004 018 728
Feb. 18, 2005 (DE) .......................... 10 2005 007 446

(51) Int. Cl.
*B60T 13/74* (2006.01)
(52) U.S. Cl. ................................................ 701/70
(58) Field of Classification Search .................. 701/70; 188/266, 271; 73/379.06
See application file for complete search history.

(56) References Cited

U.S. PATENT DOCUMENTS

| 5,573,088 | A  | * | 11/1996 | Daniels ........................ 188/267 |
| 6,514,592 | B1 | * | 2/2003 | Hubbard et al. ............. 428/66.2 |
| 6,923,295 | B2 | * | 8/2005 | Halasy-Wimmer et al. . 188/71.2 |
| 2003/0150677 | A1 | | 8/2003 | Maron et al. |

FOREIGN PATENT DOCUMENTS

| DE | 19639686 | 4/1998 |
| DE | 19730094 | 1/1999 |
| DE | 10123568 | 11/2002 |
| DE | 10205013 | 2/2003 |
| WO | 0168428 | 9/2001 |
| WO | 03011668 | 2/2003 |

* cited by examiner

*Primary Examiner* — Yonel Beaulieu

(57) ABSTRACT

Disclosed are a method and a control system for applying defined clamping forces in a brake that is electrically operable by an actuator and includes a first friction surface (friction lining) and a second friction surface (brake disc). In the method, a correlation exists between the actuator position and the clamping force, and values of the clamping force as well as of the actuator position are determined. In order to improve the control quality when implementing the method, the nominal value ($F_{nominal}$) and the actual value ($F_{meas}$) of the clamping force are filtered in each one low-pass filter (9, 10) of nth order, whose limit frequency is determined from a correlation between the actual value ($n_{actual}$) of the actuator speed and the filtered value ($F_{nominalFilt}$) of the clamping force, and that the filtered values ($F_{nominalFilt}$, $F_{measFilt}$) of the clamping force are transformed by means of a predefined characteristic curve into a nominal value ($\phi_{nominal}$) and an actual value ($\phi_{actual}$) of the actuator position.

2 Claims, 1 Drawing Sheet

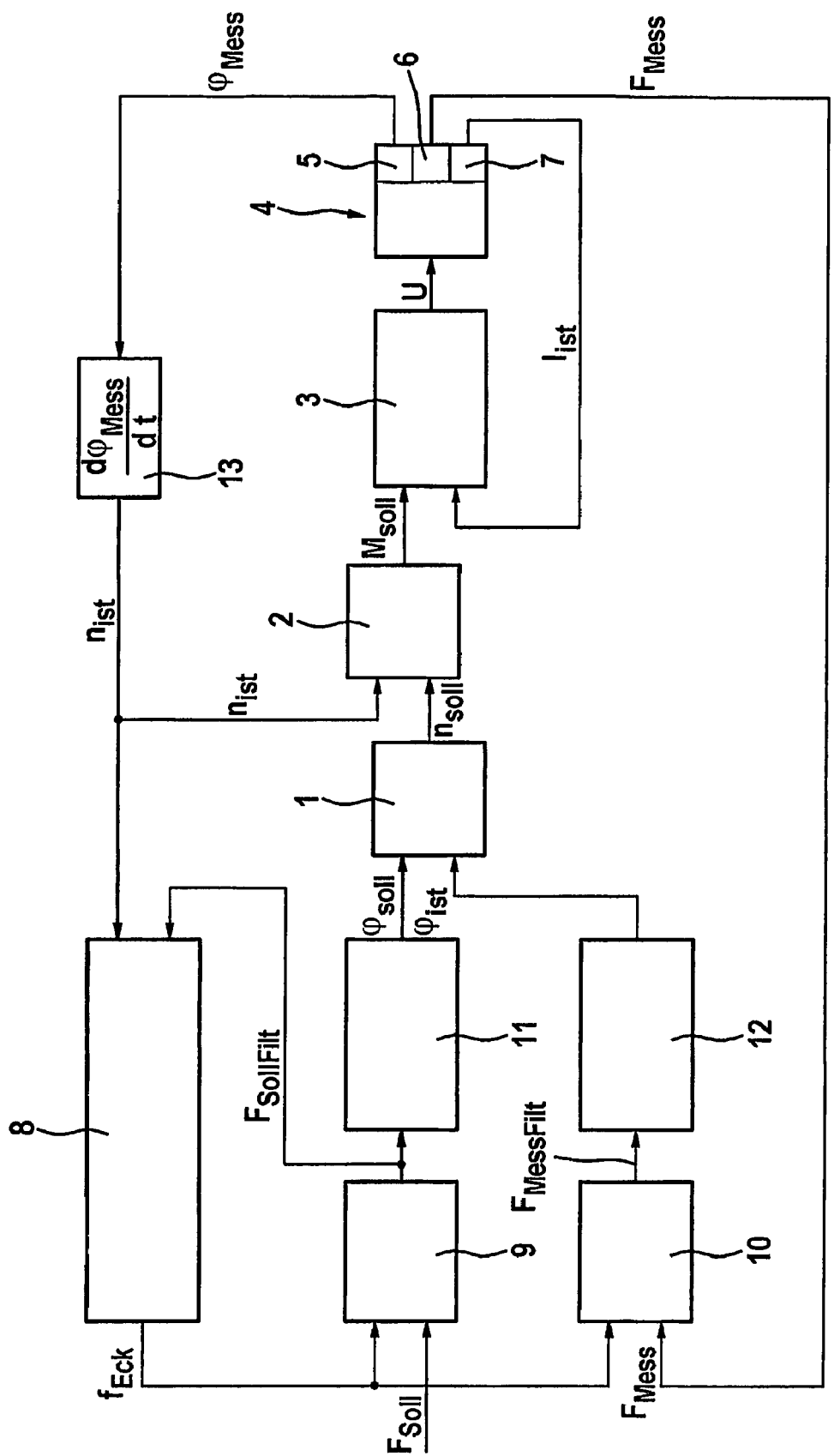

METHOD AND CONTROL SYSTEM FOR APPLYING DEFINED CLAMPING FORCES

BACKGROUND OF THE INVENTION

The present invention relates to a method and a control system for applying defined clamping forces in a brake that is electrically operable by means of an actuator and includes a first friction surface (friction lining) and a second friction surface (brake disc), wherein a correlation exists between the actuator position and the clamping force, and wherein values of the clamping force as well as of the actuator position are determined, the values being measured by means of a clamping force sensor and a position sensor.

International patent application WO 01/68428 discloses a method and a control system for applying defined clamping forces in a disc brake that is operable by means of an electric motor using a reduction gear. The special features of the prior art method involve that the above-mentioned correlation between the actuator position and the clamping force is illustrated by a mathematical model, preferably by a polynomial of second order. When realizing the prior art method, especially in the lower range of the clamping force, a sensitively adjusted controller is used because the boosting factor of the actuator diminishes gradually in this range. However, a sensitively adjusted controller will augment possibly occurring interferences from outside in the force sensor signal so that driving comfort becomes unsatisfactory in the most unfavorable case. External interferences of this type become conspicuous especially in the lower range of the clamping force because the force sensor operates at its bottom limit of detection. Low-pass filtering of the clamping force signal can eliminate the interferences. However, the result will be an impaired dynamics of control because the filtered signal is available only with a phase shift relative to the original signal.

In view of the above, an object of the invention is to disclose a method and a control system permitting improvement of the control quality of the control system referred to hereinabove.

SUMMARY OF THE INVENTION

According to the method, this object is achieved in that the nominal value and the actual value of the clamping force are filtered in each one low-pass filter of nth order whose limit frequency is not constant but is changed in response to the current actuator rotational speed and the filtered nominal value of the actuator clamping force. This change occurs in such a fashion that, with quick changes of the nominal value and at high rotational speeds that occur especially in more intense brake operations, the filter has only very weak effects, while at low rotational speeds and with slow changes of the nominal value that occur especially in the range of comfort braking, intense filtering takes place, which eliminates the possibly prevailing interferences on the force sensor signal. The so filtered values of the clamping force are then transformed into a nominal value and an actual value of the actuator position by means of a predefined characteristic curve, with the objective of linearizing the non-linear characteristics of the actuator so that an invariably adjusted position controller can be used for adjusting the desired clamping force.

To render the idea of the invention more precise, the limit frequency of the low-pass filters, based on a predetermined maximum value, will reach a predefined minimum value with a decreasing amount of the actuator rotational speed from the actuator maximum rotational speed until the actuator rotational speed n=0. The characteristic curve used for transformation ideally corresponds to the inverse function of a predetermined correlation between the actuator position and the clamping force so that linearization of the non-linear correlation between actuator position and actuator clamping force is achieved.

In a favorable aspect of the method of the invention, the limit frequency of the low-pass filters is changed also in response to the change of the amount of the unfiltered or filtered nominal value of the clamping force.

The control system of the invention for implementing the method explained hereinabove is generally comprised of:

a first controller, the output quantity of which corresponds to an actuator speed nominal value;

a second controller (speed controller) that is connected downstream of the first controller and to which signals representative of the actuator speed nominal value and an actuator speed actual value are sent as input quantities, the output quantity of said controller corresponding to an actuator torque nominal value; as well as a third controller (current controller) that is connected downstream of the second controller and to which signals representative of the actuator torque nominal value and an actual value of the current to be supplied to the actuator are sent as input quantities, the output quantity of said controller representing a correcting variable for adjusting the actual value of the current to be supplied to the actuator.

The control system of the invention is favorably characterized by the provision of low-pass filters to which are sent the nominal value and the actual value of the clamping force, and the output quantities of which are sent to each one linearization element in which the filtered clamping force values are transformed into a nominal value and an actual value of the actuator position by means of a predefined characteristic curve, the first controller being configured as a position controller which is furnished with these actuator position values as input quantities.

In a favorable improvement of the control system, a frequency calculation module for calculating the limit frequency of the low-pass filters is provided based on the actual value of the actuator speed and the filtered or unfiltered nominal value of the clamping force.

Further details, features, and advantages of the invention can be seen in the following description of an embodiment by making reference to the accompanying drawing showing a design of a control loop for implementing the method of the invention.

BRIEF DESCRIPTION OF THE DRAWING

The FIGURE shows a control loop.

DETAILED DESCRIPTION OF THE DRAWING

The control system illustrated in the drawing is generally comprised of a first controller 1, a second controller or speed controller 2 connected downstream of the first controller 1, as well as a third controller or current controller 3 connected downstream of the speed controller 2, with an integrated servo booster generating a voltage U that is applied to an actuator 4 (only represented) of an electromechanically operable brake. The actuator 4 is preferably equipped with a clamping force sensor 6, a position measuring system or position sensor 5, and a current sensor 7, with the signal $I_{actual}$ of the current sensor 7 that corresponds to the actuator current actual value being sent as an input quantity to the current controller 3 mentioned hereinabove.

The output signal $F_{meas}$ of the clamping force sensor 6 representative of the measured clamping force or the actual value of the clamping force is sent to a low-pass filter 10, whose output quantity $F_{measFilt}$ is transformed in a linearization module 12 into a signal representative of the actual value $\phi_{meas}$ of the actuator position. A signal $F_{nominal}$ predetermined by the driver and representative of the nominal value of the clamping force is sent to a low-pass filter 9, the output quantity $\phi_{nominalFilt}$ of which is transformed in a linearization module 11 into a signal representative of the nominal value $\phi_{nominal}$ of the actuator position. The above-mentioned quantities $\phi_{nominal}$ and $\phi_{actual}$ are sent as input quantities to the first controller 1, which is configured as a position controller.

Further, it can be taken from FIG. 1 that the signal $\phi_{meas}$ that corresponds to the measured actuator position is differentiated as a function of time in a differentiator 13, whereby an actuator speed actual value $n_{actual}$ is produced. The actuator speed actual value $n_{actual}$ represents a first input quantity of the speed controller 2, whose second input quantity reflects the output quantity $n_{nominal}$ of the above-mentioned first controller or position controller 1. The output quantity of the speed controller 2 corresponds to a nominal value $M_{nominal}$ of the brake torque applied by the actuator 4.

The actuator speed actual value $n_{actual}$ along with the output quantity of the low-pass filter 9 $F_{nominalFilt}$ is further sent to a frequency calculation module 8 in which limit frequency values $f_{limit}$ for the two low-pass filters 9 and 10 are calculated.

Using the method of the invention, it has been achieved not only to completely perform the linearization, but also to considerably reduce the influence of extraneous interferences in the bottom range of force during comfort brake operations without losing dynamics.

The invention claimed is:

1. A control system for applying defined clamping forces in a brake that is electrically operable by an actuator (4) and includes a first friction surface (friction lining) and a second friction surface (brake disc), the control system comprising:

- a clamping force sensor to determine the clamping force ($F_{meas}$);
- a position sensor to determine the actuator position ($\phi_{meas}$), wherein a correlation exists between the actuator position ($\phi_{meas}$) and the clamping force ($F_{meas}$);
- a first controller (1) having an output quantity that corresponds to an actuator speed nominal value ($n_{nominal}$);
- a second controller (2) (speed controller) that is connected downstream of the first controller and to which signals representative of the actuator speed nominal value ($n_{nominal}$) and an actuator speed actual value ($n_{actual}$) are sent as input quantities, the output quantity of the second controller corresponding to an actuator torque nominal value ($M_{nominal}$);
- a third controller (3) (current controller) that is connected downstream of the second controller and to which signals representative of the actuator torque nominal value ($M_{nominal}$) and an actual value ($I_{actual}$) of the current to be supplied to the actuator are sent as input quantities, the output quantity of the third controller representing a correcting variable (U) for adjusting the actual value ($I_{actual}$) of the current to be supplied to the actuator; and
- a plurality of low-pass filters (9, 10), wherein the nominal value ($F_{nominal}$) and the actual value ($F_{meas}$) of the clamping force are sent to the low-pass filters, and the output quantities ($F_{nominalFilt}$) and ($F_{measFilt}$) are sent to each one linearization module (11, 12) in which the filtered clamping force values are transformed into a nominal value ($\phi_{nominal}$) and an actual value ($\phi_{actual}$) of the actuator position by a predefined characteristic curve, the first controller (1) being configured as a position controller which is furnished with the actuator position values ($\phi_{nominal}$, $\phi_{actual}$) as input quantities.

2. A system according to claim 1, wherein a frequency calculation module (8) for calculating the limit frequency of the low-pass filters (9, 10) based on the actual value of the actuator speed ($n_{actual}$) and the filtered nominal value ($F_{nominalFilt}$) of the clamping force is provided.

* * * * *